United States Patent [19]

Chen et al.

[11] Patent Number: 5,369,453
[45] Date of Patent: Nov. 29, 1994

[54] METHOD AND EYEGLASSES FOR RECTIFYING COLOR BLINDNESS

[76] Inventors: Xiaoguang Chen, 134 Sidalin St.; Zhong Lu, 4 Huxi Rd., both of Changchun 130022 Jilin, China

[21] Appl. No.: 155,719

[22] Filed: Nov. 23, 1993

Related U.S. Application Data

[63] Continuation-in-part of Ser. No. 813,710, Dec. 27, 1991, abandoned.

[51] Int. Cl.$^5$ .............................................. G02C 7/10
[52] U.S. Cl. ..................................... 351/163; 351/177
[58] Field of Search ............... 351/163, 164, 165, 177, 351/159

[56] References Cited

U.S. PATENT DOCUMENTS 5,054,902 10/1991 King ................................ 351/163
5,218,386 6/1993 Levien ............................. 351/163

*Primary Examiner*—Scott J. Sugarman
*Attorney, Agent, or Firm*—David H. Semmes

[57] ABSTRACT

Rectifying method for color blindness and rectifying eyeglasses for color blindness by using a computer to simulate the process of rectifying color blindness, there are produced 32 kinds of spectrums and parameters of rectifying eyeglasses for color blindness, which are then grouped under four types. The rectifying eyeglasses for color blindness change the proportion of stimulus of three kinds of optic cone cells on the retina and alter the color codes of the visional area of cerebral cortex, thus when a color-blind viewer wears the eyeglasses chosen properly, the ability of discrimination between different colored objects is greatly improved.

15 Claims, 2 Drawing Sheets

METHOD AND EYEGLASSES FOR RECTIFYING COLOR BLINDNESS

CROSS REFERENCE TO RELATED APPLICATIONS

This is a continuation-in-part of copending application Ser. No. 07/813,710 filed on Dec. 27, 1991, now abandoned.

BACKGROUND OF THE INVENTION

The present invention relates to a method for rectifying color blindness and eyeglasses employed therein.

As a genetic disease, color blindness is believed incurable. At present there are at least 2.5 hundred million people suffering from abnormal color vision. Before the present invention, whether color blindness was rectifiable had been under discussion, and research had been conducted in this field, resulting in no breakthrough achievements. As early as in 1878, Delboeuf and Spring noted that red optical filtering devices may be used to help abnormal color viewers to discriminate between different color objects. Many types of optical filtering devices were designed to improve the color blind viewers' ability to distinguish pseudo-isocolors. For example, U.S. Pat. No. 4,300,819 discloses a pair of improved eyeglasses which can aid color discrimination for color blind viewers. The eyeglasses have two lenses, one is clear and the other is colored. To appear identical to the observers, each lens is additionally coated or formed to have a reflective or mirror-like surface. This kind of eyeglasses can only improve color sensation of the color blind viewers. U.S. Pat. No. 5,149,183 also discloses color enhancing sun glasses which attenuate blue and red light thereby preventing human eyes from harmful effects of such light. The transmission curves therein are specifically designed to attenuate certain light not to correct color blindness.

At present, all researchers only use various optical filtering devices, experimentally to rectify color blindness. There are no devices to test color blindness quantitatively. In fact, the light sensitivity of eyes in the range of visible light differ with wavelength. It is believed in physiology that color blindness is caused by some errors occurring during recognition of colored objects. The errors may occur during certain physiological processes of transmission of color signals in retina. The external manifestation of color blindness is the change of sensitivity of eyes in the range of visible light. Whereas optical filtering devices in the patents above could rectify color blindness in certain degrees, there is not theoretical basis therefor and the effects are poor. The reason is that prior art optical filtering devices are not designed according to the spectral sensitive curves of the abnormal color viewers. Moreover it is impossible to rectify all kinds of color blindness simply using single or compound optical filtering devices. One should adopt different optical filtering devices for different spectral sensitive curves of abnormal color viewers.

SUMMARY OF THE INVENTION

The present invention provides a new method and apparatus for rectifying color blindness. On the basis of researches of color vision and color blind topology, a cusp catastrophic model of abnormal color vision and a flowchart of conduction of color information are proposed as well as a quantitative research of color blindness and rectifying color blindness. One uses a computer to simulate the rectifying spectral curves. According to the result of the research hereunder, four types or 32 subtype of spectrums and parameters of rectifying eyeglasses for color blindness are obtained. When an abnormal color viewer wears a pair of rectifying eyeglasses which are produced, matching his/her special spectral sensitive curves, his/her color discrimination objects are normalized.

A lot of clinical experiments herein demonstrated that most abnormal color viewers have tricolor sensitivity and distinguish the three primary colors. Only in certain range of wavelength, the viewer's ability of discrimination between color objects is poor. According to the views that color recognition is a topological mapping from points to points and physiology processes have stable structure, a mathematical model of color blindness is established herein. Its basis is that the cause of color blindness comprises abnormal color codes which may be produced in the following three phenomena: first, abnormal proportion of brightness signal and two color signals sent by the ganglionic cells while the color information coded by the matrix transformation in retina, this abnormality is because of abnormal information acceptance of certain color elements; second, abnormal proportion of the visional energy radiated to the cerebral cortex while the color information decoded by matrix transformation in the lateral geniculate body by the optic nerves; this abnormality being due to abnormal cells; third, abnormal color codes are extant because of abnormal cells of the visional area of cerebral cortex. Experiments showed that any of the above phenomena could cause abnormal color vision. When the proportion of stimulating three kinds of optic cone cells is changed externally, the codes of visional area of cerebral cortex are changed and thus the ability of discrimination between two color objects is improved.

The present invention proposes creating a mathematical model of rectifying color blindness. According to the spectral absorptive peak values of standard Red, Green and Blue optic cone cells, the subordinate function of subsets of spectral curves for three kinds of optic cones cells R (red), G (green), and B (blue) are:

$$R(\lambda) = e^{-(\frac{\lambda - \lambda Rmax}{\alpha R})^2}$$

$$G(\lambda) = e^{-(\frac{\lambda - \lambda Gmax}{\alpha G})^2}$$

$$B(\lambda) = e^{-(\frac{\lambda - \lambda Bmax}{\alpha G})^2}$$

where $\lambda$ is the dominant wavelength; $\lambda Rmax$, $\lambda Gmax$, and $\lambda Bmax$ are wavelengths of peak values respectively; $\alpha R$, $\alpha G$, and $\alpha B$ are the weighted coefficients decided by the human race.

The information of R, G, B processes the matrix transformation in the retina and the brightness signal and color signals are modulated, thus:

$$L = L_R(R) + L_G(g) + L_B(B)$$

$$U = Ku.(R - L)$$

$$V = Kv.(B - L)$$

where L is the brightness signal; U and V are the red and blue color signals, Ku and Kv are weighted coefficients.

The above three signals are conducted respectively to the lateral geniculate body by the optic nerves, where the three primary color signals $R(\lambda)$, $G(\lambda)$ and $B(\lambda)$ are modulated by differential topological transformation:

$$R(\lambda)+U/Ku+L$$

$$G(\lambda)=L-L_R/L_G{}^* U/Ku-L_B/L_G{}^* V/Kv$$

$$B(\lambda)+V/Kv+L$$

where L is the brightness signal; U and V are the red and blue color signals, Ku and Kv are weighted coefficients.

The three primary color signals are conducted to the visional area in the cortex of cerebrum by optic radiation. The normal visional sensitivity of the visible light are equal to the sum of $R(\lambda)$, $G(\lambda)$ and $B(\lambda)$, i.e.:

$$F(\lambda)=R(\lambda)+G(\lambda)+B(\lambda)$$

where $\lambda\epsilon[380\ NM, 780\ NM]$ is the wavelength. $F(\lambda)$ is the normal sensitive curve in the range of visible light.

For the abnormal viewers, the $R(\lambda)$, $G(\lambda)$ and $B(\lambda)$ differ from that of normal viewers which satisfy the cusp catastrophic model:

$$F(L)=L^4+U^*L^2+V^*L$$

where L is brightness signal, U and V are color signals.

Therefore, in color blindness it may be regarded as that the proportion of $R(\lambda)$, $G(\lambda)$ and $B(\lambda)$ is maladjusted; that is:

$$F^*(\lambda)=a^*R(\lambda)+b^*G(\lambda)c^*B(\lambda)$$

where a, b, c$\epsilon$[0,2], not a=b−c=1

Let $F(\lambda)$ be the rectifying curve satisfies:

$$\delta^*F(\lambda)=F^*(\lambda)^*\overline{F}(\lambda)$$

thus, $$\overline{F}(\lambda)=\delta F(\lambda)/F^*(\lambda)$$

wherein $\delta<1$ may affect the transmissivity of eyeglasses.

The present invention uses testing and a rectifying expert system to simulate the above model. The flowchart of the system is shown in FIG. 1.

By using a computer to simulate the cusp catastrophic model of color recognition, the present invention can control the proportion of three primary colors and saturation, quantitatively. All the grades of three primary colors and saturation are 64. Owing to using high resolution color display, the pseudoisochromatic plates are lifelike, clear and stable. The plates can be chosen arbitrarily, thus precluding abnormal color viewers from being forced to remember the plates. Through human-machine dialogue, the color blindness is rectified. The prescription, the spectral sensitive curves for rectifying color blindness, are printed out.

In further summary, the present invention consists of the following essential requirements:

A) The cause of color blindness is due to abnormal color codes. So long as the proportion of stimulation of three kinds of optic cone cells is changed externally, the color codes of visional area of the cerebral cortex are changed and the color blindness is rectified.

B) There must be a mathematical model of abnormal color vision and the theory of rectifying color blindness.

C) There must be a transmission flowchart of color vision information.

D) There must be a determination of spectral sensitive curves for rectifying color blindness.

E) One requires a computer simulation of the model—the diagnosis of color blindness.

The object of the present invention is to overcome the shortcomings of the prior art by providing a method for rectifying color blindness and rectifying eyeglasses for abnormal color viewers.

DETAILED DESCRIPTION OF A PREFERRED EMBODIMENT

On the basis of the above theory, about 300 abnormal color viewers were tested using a computer and the following report evolved.

The computer is programmed to simulate the rectifying curve $F(\lambda)$ and the display on the screen is controlled to approach the particular rectifying curve which best suits the tested viewer. In this way, the same number of corresponding rectifying curves are obtained. These curves, each having its particular spectral characteristic, are classified as four types A, B, C, D in accordance with their spectral characteristics, FIG. 2 although many more types may be classified. Then each of the four types is further divided into eight subtypes mainly in consideration of the color discrimination of human eyes and a possible minimal grade of transmissivity of a lens which may be obtained economically by current lens grinding and coating techniques.

Based upon 32 subtypes of rectifying curves, 32 test patterns are designed, each corresponding to a subtype. These patterns are stored in a computer and can be chosen arbitrarily when a viewer is tested. This prevents abnormal viewers from being forced to remember the patterns. When a particular pattern is discriminated by the tested viewer, the curve corresponding to the pattern is determined to be the correct rectifying curve for this viewer.

By using vacuum coating technology, 32 types of eyeglasses are produced with a tolerance of less than 10 nm 0/0 at peak wavelength and less than 2 nm 0/0 for transitivity. Each of the eyeglasses yields a transmission curve which is substantially identical to a subtype of rectifying curve. The lenses of the eyeglasses may comprise optical glass.

According to the color sensitivity feature of the Chinese we choose that:

$$\lambda Rmax=600\ nm, \lambda Gmax=535\ nm, \lambda Bmax=440\ nm$$

wherein the weighted coefficients are:

αR=600, αG=300, αB=200

Type A

The upper and lower limits of the transmissivity of the first type of spectral curves and parameters, defined as A type, at the wavelength of 440 nm, 535 nm and 600 nm are respectively 80% and 40%, 40% and 4% and 95% and 60%.

Type B

The upper and lower limits of the transitivity of the second type of spectral curves and parameters, defined as B type, at the wavelength of 440 nm, 535 nm and 600 nm are respectively 40% and 2%, 1% and 1% and 95% and 60%.

Type C

The upper and lower limits of the transmissivity of the third type of spectral curves and parameters, defined as C type, at the wavelength of 440 nm, 535 nm and 600 nm are respectively 85% and 50%, 70% and 50% and 90% and 53%.

Type D

The upper and lower limits of the transmissivity of the fourth type of spectral curves and parameters defined as D type, at the wavelength of 440 nm, nm and 600 nm are respectively 32% and 0%, 68% and 40% and 90% and 60%.

The spectral curves are normal distribution curves with the above transmissivity at wavelength 440 nm, 535 nm and 600 nm.

Figure 1:
FIG. 1 depicts a flow chart of the overall method and eyeglasses.
Figure 2:
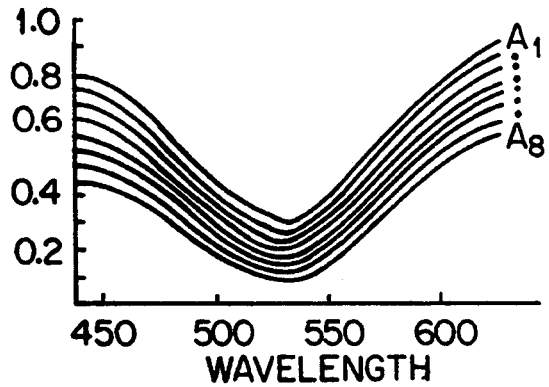
FIG. 2 depicts a Type A rectifying curve.
Figure 3:
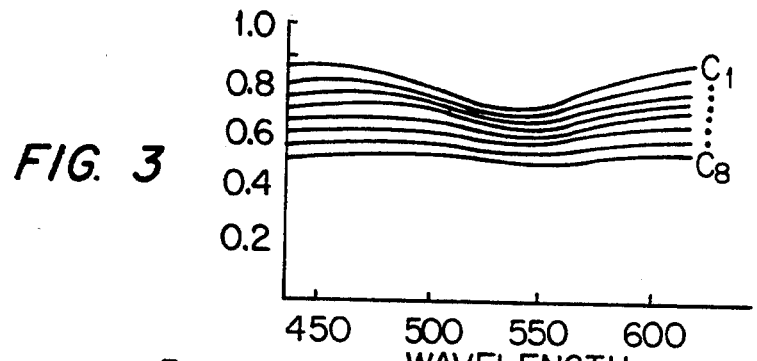
FIG. 3 depicts a Type C rectifying curve.
Figure 4:
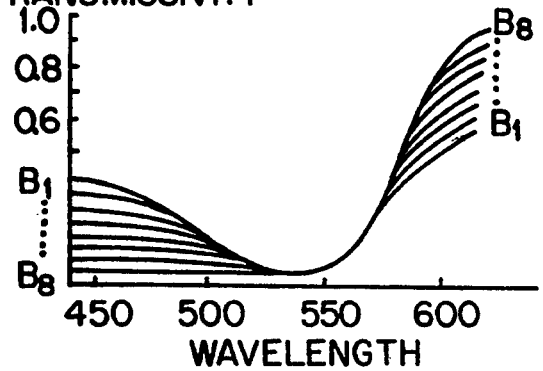
FIG. 4 depicts a Type B rectifying curve.
Figure 5:
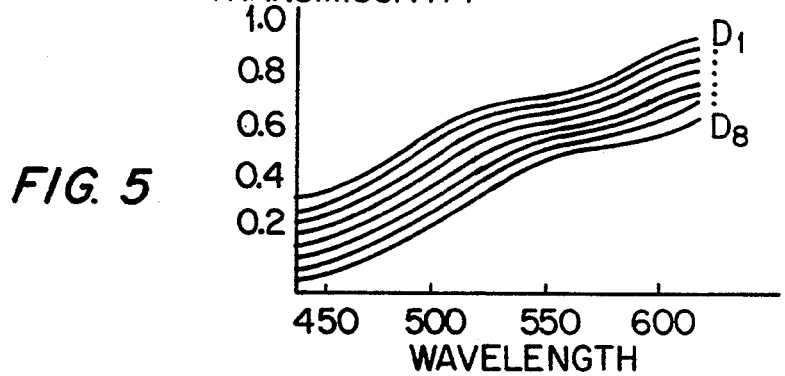
FIG. 5 depicts a Type D rectifying curve.

Each of the aforesaid A, B, C and D is divided further into 8 kinds listed below in Table 1. The spectral curves are shown in FIG. 2.

TABLE 1

| The Spectrums and Parameters of the Rectifying Eyeglasses for Color Blindness | | | | | | | | |
|---|---|---|---|---|---|---|---|---|
| | transmissivity at the wave lengths | | | | | | | |
| wavelength | 1 | 2 | 3 | 4 | 5 | 6 | 7 | 8 |
| Type A | | | | | | | | |
| 440 | 80 | 75 | 70 | 65 | 60 | 55 | 50 | 40 |
| 535 | 40 | 35 | 30 | 25 | 20 | 15 | 9 | 4 |
| 600 | 95 | 90 | 85 | 80 | 75 | 70 | 65 | 60 |
| Type B | | | | | | | | |
| 440 | 40 | 35 | 30 | 25 | 20 | 15 | 10 | 3 |
| 535 | 1 | 1 | 1 | 1 | 1 | 1 | 1 | 1 |
| 600 | 60 | 65 | 70 | 75 | 80 | 85 | 90 | 95 |
| Type C | | | | | | | | |
| 440 | 85 | 80 | 75 | 70 | 65 | 60 | 55 | 50 |
| 535 | 70 | 67 | 64 | 61 | 59 | 56 | 53 | 50 |
| 600 | 90 | 85 | 80 | 75 | 70 | 65 | 60 | 53 |
| Type D | | | | | | | | |
| 440 | 32 | 27 | 22 | 17 | 12 | 7 | 2 | 0 |
| 535 | 68 | 64 | 60 | 56 | 52 | 48 | 44 | 40 |
| 600 | 90 | 85 | 80 | 76 | 72 | 68 | 64 | 60 |

The preferred method and apparatus embodiments of the present invention are only a description not a restriction to the rectifying method for color blindness and rectifying eyeglasses for color blindness. In light of the above concepts, many other modifications and variations of the present invention are possible and those are within the scope of the ensuing claims.

We claim:

1. A method for rectifying color blindness comprising the steps of:

a) programming a computer to simulate a predetermined color blindness, $F(\lambda)=\delta \cdot F(\lambda)/F^*(\lambda)$, $F(\lambda)$ being the rectifying curve satisfying $\delta^*F(\lambda)=F^*(\lambda)^*F(\lambda)$, wherein $\delta$ is a coefficient affecting transmissivity of a lens;

b) randomly selecting at least 300 abnormal color viewers;

c) testing said viewers, using said computer, thereby obtaining at least 300 different rectifying curves;

d) classifying said at least 300 rectifying curves as types A, B, C and D in accordance with their spectral characteristics, wherein as to A the wavelength of 440 nm, 535 nm and 600 nm are respectively 80% and 40%, 40% and 4% and 95% and 60%; wherein as to B the wavelength of 440 nm, 535 nm and 600 nm are respectively 40% and 2%, 1% and 1% and 95% and 60%; wherein as to C the wavelength of 440 nm, 535 nm and 600 nm are respectively 85% and 50%, 70% and 50% and 90% and 53%; wherein as to D the wavelength of 440 nm, 535 nm and 600 nm are respectively 32% and 0%, 68% and 40% and 90% and 60%;

e) classifying each of said types into eight subtypes; in consideration of color discrimination of human eyes;

f) designing thirty-two kinds of color blindness test patterns, based upon said thirty-two subtypes of rectifying curves, each said pattern corresponding to a rectifying curve;

g) testing a patient's reaction to said patterns and determining a special curve corresponding to a pattern that cannot be discriminated by the patient;

h) providing a pair of lenses for the patient which are coated to have a transmission curve substantially identical with the rectifying curve determined in step (f), above.

2. The method of claim 1, wherein $$F(\lambda)=R(\lambda)+G(\lambda)+B(\lambda)$$

$$F^*(\lambda)=aR(\lambda)+bG(\lambda)+cB(\lambda)$$

further wherein $R(\lambda)$, $G(\lambda)$, $B(\lambda)$ are subordinate functions of subsets of spectral curves for three kinds of optic cone cells Red, Green, Blue respectively, and wherein a, b, c$\epsilon$[0,2], not a, b, c=1.

3. The method of claim 1, wherein said rectifying curves and corresponding test patterns are stored in a computer.

4. The method of claim 1, wherein said testing and determining step is performed by means of a computer in which said test patterns and rectifying curves are stored.

5. The method of claim 1, wherein a transmissivity of said lenses is adjusted at 440 nm, 535 nm and 600 nm in accordance with said rectifying curves.

6. The method of claim 5, wherein as to lenses having a transmission curve which is substantially coincident with one subtype of said spectral curves of type A, a transmissivity thereof has an upper and a lower limit of 80% and 40% at 440 nm, 40% and 4% at 535 nm, 95% and 60% at 600 nm respectively.

7. The method of claim 5, wherein as to lenses having a transmission curve which is substantially coincident with one subtype of said spectral curves of type B, a transmissivity thereof has an upper and a lower limit of 40% and 2% at 440 nm, 1% and 1% at 535 nm, 95% and 60% at 600 nm respectively.

8. The method of claim 5, wherein as to lenses having a transmission curve which is substantially coincident with one subtype of said spectral curves of type C, a transmissivity thereof has an upper and a lower limit of 85% and 50% at 440 nm, 70% and 50% at 535 nm, 90% and 53% at 600 nm respectively.

9. The method of claim 5, wherein as to lenses having a transmission curve substantially coincident with one subtype of said spectral curves of type D, a transmissivity thereof has an upper and a lower limit of 32% and 0% at 440 nm, 68% and 40% at 535 nm, 90% and 60% at 660 nm respectively.

10. A pair of eyeglasses for rectifying color blindness in a given patient, including a pair of lenses coated to have a preselected transmission curve which is substantially coincident with one subtype of rectifying curves determined by the following steps;
   a) programming a computer to simulate a predetermined color blindness, $F(\lambda)=\delta \cdot F^*(\lambda)/F^*(\lambda)$, $F(\lambda)$ being the rectifying curve satisfying $\delta^*F(\lambda)=F^*(\lambda)^*F(\lambda)$, wherein $\delta$ is a coefficient affecting transmissivity of a lens;
   b) randomly selecting at least 300 abnormal color viewers;
   c) testing said viewers, using said computer, thereby obtaining at least 300 different rectifying curves;
   d) classifying said at least 300 rectifying curves as types A, B, C and D in accordance with their spectral characteristics, wherein as to A the wavelength of 440 nm, 535 nm and 600 nm are respectively 80% and 40%, 40% and 4% and 95% and 60%; wherein as to B the wavelength of 440 nm, 535 nm and 600 nm are respectively 40% and 2%, 1% and 1% and 95% and 60%; wherein as to C the wavelength of 440 nm, 535 nm and 600 nm are respectively 85% and 50%, 70% and 50% and 90% and 53%; wherein as to D the wavelength of 440 nm, 535 nm and 600 nm are respectively 32% and 0%, 68% and 40% and 90% and 60%;
   e) classifying each of said types into eight subtypes; in consideration of color discrimination of human eyes;
   f) designing thirty-two kinds of color blindness test patterns, based upon said thirty-two subtypes of rectifying curves, each said pattern corresponding to a rectifying curve;
   g) testing a patient's reaction to said patterns and determining a special curve corresponding to a pattern that cannot be discriminated by the patient;
   h) providing a pair of lenses for the patient which are coated to have a transmission curve substantially identical with the rectifying curve determined in step (f), above.

11. Eyeglasses of claim 10, wherein for lenses with a transmission curve substantially coincident with one subtype of said spectral curves of type A, a transmissivity thereof has an upper and a lower limit of 80% and 40% at 440 nm, 40% and 4% at 535 nm, 95% and 60% at 600 nm respectively.

12. Eyeglasses of claim 10, wherein for lenses with a transmission curve substantially coincident with one subtype of said spectral curves of type B, a transmissivity thereof has an upper and a lower limit of 40% and 2% at 440 nm, 1% and 1% at 535 nm, 95% and 60% at 600 nm respectively.

13. Eyeglasses of claim 10, wherein for lenses with a transmission curve substantially coincident with one subtype of said spectral curves of type C, a transmissivity thereof has an upper and a lower limit of 85% and 50% at 440, 70% and 50% at 535 nm, 90% and 53% at 600 nm respectively.

14. Eyeglasses of claim 10, wherein for lenses with a transmission curve substantially coincident with one subtype of said spectral curves of type C, a transmissivity thereof has an upper and a lower limit of 85% and 50% at 440 nm, 70% and 50% at 535 nm, 90% and 53% at 600 nm respectively.

15. Eyeglasses of claim 10, wherein for lenses with a transmission curve substantially coincident with one subtype of said spectral curves of type D, a transmissivity thereof has an upper and a lower limit of 32% and 0% at 440 nm, 68% and 40% at 535 nm, 90% and 60% at 660 nm respectively.

* * * * *